(12) United States Patent
Bara et al.

(10) Patent No.: US 11,446,978 B2
(45) Date of Patent: Sep. 20, 2022

(54) THERMAL ENERGY MANAGEMENT SYSTEM WITH HIGH COOLING CAPACITY IN IDLE AND HIGH PERFORMANCE PASSIVE BATTERY COOLING

(71) Applicant: Magna Steyr Fahrzeugtechnik AG & Co KG, Graz (AT)

(72) Inventors: Christoph Bara, Cologne (DE); Navid Durrani, Kerpen (DE); Martin Hötzel, Ratingen (DE); Tobias Haas, Cologne (DE); Matthias Höfler, Aachen (DE)

(73) Assignee: MAGNA STEYR FAHRZEUGTECHNIK AG & CO KG, Graz (AT)

( * ) Notice: Subject to any disclaimer, the term of this patent is extended or adjusted under 35 U.S.C. 154(b) by 344 days.

(21) Appl. No.: 16/748,937

(22) Filed: Jan. 22, 2020

(65) Prior Publication Data

US 2020/0247212 A1 Aug. 6, 2020

(30) Foreign Application Priority Data

Feb. 6, 2019 (DE) .............................. 102019102909
Jan. 10, 2020 (DE) .............................. 102020100428

(51) Int. Cl.
*B60H 1/00* (2006.01)
*B60H 1/03* (2006.01)
*B60H 1/10* (2006.01)
*B60H 1/32* (2006.01)

(52) U.S. Cl.
CPC ..... *B60H 1/00278* (2013.01); *B60H 1/00007* (2013.01); *B60H 1/00392* (2013.01); *B60H 1/00428* (2013.01); *B60H 1/00457* (2013.01); *B60H 1/034* (2013.01); *B60H 1/10* (2013.01); *B60H 1/322* (2013.01); *B60H 1/3211* (2013.01); *B60H 1/32281* (2019.05); *B60H 2001/003* (2013.01); *B60H 2001/00307* (2013.01);
(Continued)

(58) Field of Classification Search
CPC ............ B60H 1/00278; B60H 1/00007; B60H 1/00392; B60H 1/00428; B60H 1/00457; B60H 1/32281; B60H 1/034; B60H 1/10; B60H 1/3211; B60H 1/322; B60H 2001/003; B60H 2001/00307; B60H 2001/3238; B60H 2001/3255; B60H 2001/3266
See application file for complete search history.

(56) References Cited

U.S. PATENT DOCUMENTS

2009/0317697 A1 12/2009 Dogariu et al.
2017/0096073 A1 4/2017 Mardall et al.
(Continued)

FOREIGN PATENT DOCUMENTS

WO 2014000884 A1 1/2014

*Primary Examiner* — Marc E Norman
(74) *Attorney, Agent, or Firm* — Shumaker, Loop & Kendrick, LLP; James D. Miller

(57) ABSTRACT

An air conditioning and battery cooling assembly with an A/C coolant circuit and an E-drivetrain coolant circuit as well as a refrigerant circuit, wherein the A/C coolant circuit and the E-drivetrain coolant circuit are coupled together across a 4/2-way coolant valve in such a way that the A/C coolant circuit and the E-drivetrain coolant circuit can be operated separately or can receive a flow in serial manner.

15 Claims, 8 Drawing Sheets

(52) U.S. Cl.
CPC ............... *B60H 2001/3238* (2013.01); *B60H 2001/3255* (2013.01); *B60H 2001/3266* (2013.01)

(56) References Cited

U.S. PATENT DOCUMENTS

2020/0220236 A1* 7/2020 Durrani .............. B60H 1/32284
2021/0305644 A1* 9/2021 Ernst .................. H01M 10/635

* cited by examiner

THERMAL ENERGY MANAGEMENT SYSTEM WITH HIGH COOLING CAPACITY IN IDLE AND HIGH PERFORMANCE PASSIVE BATTERY COOLING

CROSS-REFERENCE TO RELATED PATENT APPLICATIONS

The present disclosure claims the benefit of German Patent Application No. DE 102019102909.0 filed Feb. 6, 2019 and German Patent Application No. DE 102020100428.1 filed Jan. 10, 2020, the contents of which are hereby incorporated herein by reference in their entirety.

FIELD

The invention relates to an air conditioning and battery cooling assembly with high cooling capacity and passive battery cooling for battery-operated electric vehicles and a method for the air conditioning of the vehicle and the cooling of the batteries.

In particular, the invention relates to the concept of a thermal system for electric vehicles, vehicles with hybrid drive or fuel cell vehicles, which are operated with so-called high-voltage batteries or storage batteries. The aforementioned highly electrified vehicles are often outfitted with a capability of quick charging of the electrical energy accumulators. This comes with heightened requirements on the cooling of the corresponding energy accumulator during the quick charging. Long charging paths result in high electrical losses, among other things, and consequently result in intense heating of the energy accumulator.

Hence, especially high cooling capacities must be provided by the thermal system during the quick charging process of the batteries, which constitutes a challenge for conventional battery cooling systems.

BACKGROUND

From the standpoint of the driver and user of the battery-operated electric vehicles, the charging time of the high-voltage battery is a major drawback. For example, at a typical household receptacle, the charging time for the high-voltage battery is eight to twelve hours. The range of the battery-operated electric vehicles consequently is generally between 150 and 300 kilometers, so that the users must often charge their vehicles.

Hence, an important prerequisite and principal feature for the increased acceptance of electric vehicles is to significantly curtail the charging time of the high-voltage batteries. For this reason, work is being done on so-called ultra-fast charging technologies, in order to reduce the charging time of the batteries to around 20 minutes. The charging infrastructure necessary for this will be further expanded in the coming years along the principal traffic routes in Europe. With corresponding technologies, such as the so-called "Ultra Fast High Powered Charging Network", charging capacities of up to 350 kilowatts will be provided, so that the charging of the batteries is comparable to the refueling of fuel-consuming vehicles at traditional gas stations. Among the drawbacks of the quick charging of batteries is the fact that lithium ion batteries, for example, along with a relatively high power density, are also prone to overcharging, deep discharging, and large charging currents, which may lead to a fast overheating of the high-voltage batteries, especially when ambient temperatures are high. In order to avoid damage to the high-voltage battery, the charging electronics monitor the status of the batteries, including the voltage and the temperature, and adapt the charging current accordingly.

In order to assure high charging speeds during the quick charging process, an active cooling of the high-voltage battery is required, so as to keep it in a given temperature range of 10° C. to 35° C. High-voltage battery coolers are known for this purpose in the prior art, being connected directly with refrigerant cooling or indirectly with coolant cooling to the refrigeration circuit of the vehicle and maintaining the batteries accordingly at the desired temperature level. The waste heat generated by the battery cells is taken up by the coolant or by the refrigerant and given off to the surroundings or possibly even utilized for the heating of the passenger compartment.

In directly refrigerant-cooled systems for battery cooling, the refrigerant circuit at the low-pressure side takes up the waste heat of the high-voltage battery or the passenger compartment by the evaporation of the refrigerant in the evaporator. The evaporated refrigerant is compressed by the compressor to a higher pressure level. Due to the work of compression, additional heat is supplied to the refrigerant. At the outlet from the compressor, the refrigerant enters the condenser as high-pressure gas with high temperature. Inside the condenser, the heat of evaporation and compression previously taken up is given off either to the air, in an air-cooled condenser, or to a coolant, such as in a water-cooled condenser. The refrigerant leaves the condenser in liquid form, but still under high pressure, before entering the expansion element. The refrigerant flowing through the expansion element is expanded from a high pressure to a low pressure level. With this, the temperature of the refrigerant likewise drops to a level which is suitable for again taking up the waste heat. The cold and liquid refrigerant enters the evaporator and can again take up heat under evaporation, thereby closing the refrigerant circuit.

During the quick charging process, around 8 kilowatts to 12 kilowatts of waste heat are produced in the battery cells. At high ambient temperatures, the cooling capacity of the vehicle's climate control system must therefore be able to take up the resulting battery waste heat, in addition to the passenger compartment air conditioning, in order to lower the temperature of the cells below a critical value and maintain it there.

In known systems, the performance of the condenser, also known as a radiator when it is an air-type heat exchanger, represents a weak point and its proper dimensioning constitutes a major challenge. In the case of direct heat transfer via the condenser or in indirect heat transfer via the radiator, the entire heat of evaporation from the passenger compartment and the battery as well as the heat of compression of the compressor is given off to the ambient air.

During the quick charging process, the condenser or the radiator must therefore be able to transfer around 20 kilowatts to 22 kilowatts of waste heat from the air conditioning system to the surroundings while the vehicle is hooked up to the receptacle during the ongoing charging process. A traditional condenser or a simple radiator, however, is not able to provide such a performance in idling operation with the vehicle at standstill. Only at high air speeds, produced by the driving wind during travel, can the condenser or the radiator provide the required performance.

For this reason, the heat transfer of the refrigerating circuit has great influence on the charging power and thus on the charging time of a battery-operated electric vehicle.

Various systems are known in the prior art for the battery cooling of battery-operated electric vehicles.

Thus, for example, a battery cooler system with bypass is found in US 2009/0317697 A1, wherein a battery cooling is realized in combination with the air conditioning of the passenger compartment by various circuit configurations and a bypass.

The drawback of the known solutions is that the cooling capacity, especially during quick charging with the vehicle at standstill, cannot be adequately provided by the conventional systems. For this reason, other approaches to solving the problem of deficient cooling capacity are also being pursued in the prior art.

There is found in US 2017/0096073 A1 for example a charging station with a thermomanagement system of an electric vehicle during the charging phase. This system involves the connecting of the vehicle by its battery cooling circuit to an external cooling circuit of the charging station, in which the cooling capacity for the cooling of batteries can be provided adequately during the charging process.

Alternatively, a separate internal reservoir is provided in the vehicle, which can store a certain amount of the waste heat during the charging process if the external system of the charging station is not available.

The drawback of systems with external cooling capacity is that very large infrastructure expenditures are required in order to provide cooling stations in addition at electric charging stations.

Furthermore, a coupling of the cooling systems of the vehicle and the charging station for the charging process involves additional operating expense for the user. The additional coupling of the systems by making fluidic connections, in addition to the electrical connections, may also be technically more difficult to ensure than the electrical connection for the charging process of the batteries.

SUMMARY

The problem which the invention proposes to solve is therefore to cool the energy accumulators in the vehicle as needed, in keeping with the heightened requirements for same, and using the means of the on-board air conditioning.

In particular, a system should be provided which makes possible the providing of high cooling capacities during the quick charging process at standstill of the vehicle, yet which is also able to meet the typical requirement profile of vehicle climate control systems.

The problem is solved by the subject matter disclosed herein.

First of all, there are several approaches to solving the problem of boosting the cooling capacity. One approach is to increase the performance of the condenser or the radiator during standstill of the vehicle. For this, the end face of the condenser or the radiator can be enlarged. A further aspect is to provide a heat storage which can take up a certain amount of heat during the charging process. And finally, fans with high power can be used to increase the amount of air in the radiator during standstill, in order to compensate for or replace the missing driving wind.

According to the concept of the invention, the problem is solved in that the heat transfer capacity to the ambient air is increased by the connection and combination of subsystems for certain operating states and parameter constellations, wherein the individual subsystems of the heat management system are designed to be modular and can be variably interconnected or separated as needed.

The problem of the invention is solved in particular by an air conditioning and battery cooling assembly with an A/C coolant circuit and an E-drivetrain coolant circuit as well as a refrigerant circuit, wherein the A/C coolant circuit and the E-drivetrain coolant circuit are coupled together across a 4/2-way coolant valve in such a way that the A/C coolant circuit and the E-drivetrain coolant circuit can be operated separately or can receive a flow in serial manner.

Furthermore, the A/C coolant circuit comprises at least one A/C coolant radiator for heat transfer to the ambient air, a coolant pump and a condenser, by which the A/C coolant circuit is thermally connected to the refrigerant circuit.

The E-drivetrain coolant circuit comprises at least one battery cooler, a coolant pump, a drivetrain coolant radiator for heat transfer to the ambient air and a chiller, by which the E-drivetrain coolant circuit is thermally connected to the refrigerant circuit.

The refrigerant circuit comprises at least one compressor, the condenser, an ambient heat exchanger for heat transfer to the ambient air or for heat uptake from the ambient air, an expansion element and the chiller. The 4/2-way coolant valve connects the outlet of the A/C coolant radiator to the inlet of the drivetrain coolant radiator. Furthermore, a 3/2-way valve is situated at the outlet of the drivetrain coolant radiator with a connection to the A/C coolant circuit.

The position of the 4/2-way valve is chosen such that a separation of the coolant circuits into different flow sequences of the components results. In combination with an additional 3/2-way valve behind the drivetrain coolant radiator, also known as a low-temperature radiator, it is now possible to switch the valves in such a way that the electric drivetrain is no longer found in the same coolant circuit as the A/C coolant radiator and the drivetrain coolant radiator. In this way, the entire heat transfer surface on the ambient side is available to the refrigerant circuit as a heat sink. This mode of operation is especially advantageous when the vehicle is operating at standstill and at the same time quick charging of the traction battery is taking place. The drivetrain is not being cooled in this case, but only has flow in a small circuit in order to maintain the homogenization function of the coolant.

The refrigerant circuit comprises, in the main channel, the condenser and the compressor.

The main channel after the compressor is divided at a 3/2-way valve into two partial channels, which can receive a flow of refrigerant alternatively or cumulatively. One partial channel comprises the condenser and the other partial channel comprises the refrigerant¬heating heat exchanger, which functions as an internal condenser. The partial channels are again merged together in front of the ambient heat exchanger. The A/C coolant circuit is connected across the condenser to the refrigerant circuit.

The E-drivetrain coolant circuit possesses several partial channels which can be interconnected. Three coolant pumps are provided, making possible an independent flow of coolant through the partial channels so formed. One partial channel is formed as a parallel channel by the components of the E-drivetrain of front and rear drive, each with a coolant pump. Another partial channel is formed by another coolant pump, a coolant heating device and the battery cooler, there being provided in addition a bypass for the battery cooler and alternatively a bypass for the coolant heating device. The aforesaid partial channel is designed in parallel with the first mentioned partial channel. Another parallel partial channel comprises the chiller. Finally, a partial channel is formed as a connection to the drivetrain coolant radiator across the 4/2-way coolant valve. Hence, five partial channels are produced, four of which are connected in parallel with each other to the E-drivetrain coolant circuit.

The coolant may be quite generally liquids used for heat transfer, being a heat transfer agent or also a cold transfer agent, depending on the application. Especially common are water and glycol mixtures in the coolant circuits of motor vehicles, for example.

The refrigerant circuit substantially consists of the already mentioned components of the compressor, the coolant-cooled or water-cooled condenser, and the ambient heat exchanger with upstream expansion element. The ambient heat exchanger in this way can work as an aftercooler or subcooler for the condenser or as an evaporator for the heat uptake from the ambient air in the heat pump mode. Furthermore, the evaporator for the cooling of the passenger compartment and the chiller are part of channels of the refrigerant circuit. The chiller is an evaporator on the refrigerant side and accordingly it has an upstream dedicated expansion element. The chiller takes up heat from the E-drivetrain coolant circuit, to which the battery coolant channel also belongs.

The A/C coolant radiator is a liquid/air heat exchanger which is positioned in the A/C coolant circuit in a partial channel with the 4/2-way coolant valve, the A/C coolant radiator being connected at the outlet side to the 4/2-way coolant valve.

The drivetrain coolant radiator is likewise a liquid/air heat exchanger and is arranged in the E-drivetrain coolant circuit likewise in the partial channel with the 4/2-way coolant valve, the 4/2-way coolant valve being connected at the inlet side to the drivetrain coolant radiator.

The heat exchangers of the A/C coolant radiator and the drivetrain coolant radiator can each be operated separately from one another in their partial channels of the A/C coolant circuit and the E-drivetrain coolant circuit and furthermore they can also be switched in series by the 4/2-way coolant valve and thus receive a flow in series one after the other.

The ambient heat exchanger is a refrigerant/air heat exchanger which is situated in the refrigerant circuit after the condenser.

The three aforementioned heat exchangers are air-type heat exchangers, in which heat is given off to the ambient air in the refrigerator mode and heat is taken up from the ambient air in certain operating states in the heat pump operation.

The chiller is a refrigerant/coolant heat exchanger, which is situated in a partial channel of the E-drivetrain coolant circuit.

The technical concept for increasing the cooling capacity of the air conditioning and battery assembly consists in that three air-type heat exchangers are available for dissipation of waste heat at times of especially high cooling capacity requirement and consequent production of heat of condensation in the refrigerant circuit.

Furthermore, the battery cooling can occur actively or passively through the refrigerant circuit or the coolant circuit, meaning by active battery cooling a cooling of the batteries by utilizing the cooling capacity of the refrigerant circuit and by passive battery cooling the utilizing of the cooling capacity of the coolant circuit. The coolant circuit then gives off the waste heat to the ambient air in an air-type heat exchanger. A further aspect of the concept of the invention is that a temporary storage of waste heat occurs in regions of the coolant circuit separate from the battery cooling. The waste heat temporarily taken up and stored is then given off to the surroundings in other operating states.

Preferably, the refrigerant circuit comprises a refrigerant heating heat exchanger as an internal condenser for heating the passenger compartment, which is situated in the refrigerant circuit and can be switched in parallel or alternatively to the condenser.

Advantageously, the air conditioning and battery cooling assembly is augmented in that the E-drivetrain coolant circuit comprises in a partial channel a heating device, which is connected in series in front of the battery cooler and furthermore a bypass to the battery cooler is formed.

It is furthermore advantageous to form in addition a bypass to the heating device.

A coolant pump and/or an inverter and/or an E-engine heat exchanger are advantageously formed in the E-drivetrain coolant circuit and can receive a flow in parallel with the battery cooler.

Preferably, an expansion element is situated in the refrigerant circuit after the condenser and before the ambient heat exchanger, such that the ambient heat exchanger can be operated as an evaporator for heat uptake from the ambient air in heat pump mode.

Depending on the embodiment, a front evaporator with corresponding upstream expansion element and/or a rear evaporator with corresponding upstream expansion element are arranged in the refrigerant circuit, switched in parallel. Furthermore, a low pressure collector is situated in the refrigerant circuit before the compressor.

In order to increase the heating performance for the passenger compartment, an auxiliary heating device is situated at the rear evaporator and/or at the refrigerant heating heat exchanger, especially as PTC heating elements.

Preferably, two parallel channels are formed in the E-drivetrain coolant circuit for the separate parallel cooling of the front and rear drive, insofar as parallel drives are provided.

The problem of the invention is furthermore solved by a method for operating an air conditioning and battery cooling assembly in that, when the refrigerating power demand is high at high ambient temperatures and for the battery quick charging, the chiller is operated in the refrigerant circuit and the heat of condensation from the refrigerant circuit is transferred partly across the condenser to an AC coolant circuit and partly across the ambient heat exchanger to the ambient air. The coolant circuit consists of a series connection of the A/C coolant radiator, the 4/2-way coolant valve and the drivetrain coolant radiator and the 3/2-way valve, as well as the coolant-side condenser. A portion of the heat of condensation is given off to the ambient air across the AC coolant circuit, wherein the A/C coolant radiator and the drivetrain coolant radiator are connected in series across the 4/2-way coolant valve. The battery cooler and the chiller of the refrigerant circuit form a separate coolant circuit. The E-drivetrain coolant circuit is connected in the circuit across a bypass.

Advantageously, the front evaporator and/or the rear evaporator are operated in addition in the refrigerant circuit, besides the chiller, in order to generate cold for the air conditioning of the passenger compartment.

Preferably, when the refrigerating power demand is high for the air conditioning of the passenger compartment and the cooling of the E-drivetrain for the battery cooling, the chiller and the front evaporator and/or the rear evaporator are operated in the refrigerant circuit. The heat of condensation from the refrigerant circuit is transferred across the ambient heat exchanger to the ambient air and across the condenser to the A/C coolant circuit and across the A/C coolant radiator to the ambient air. The drivetrain coolant radiator surrenders the waste heat from the E-drivetrain coolant circuit to the ambient air, while the battery cooler forms with the chiller of the refrigerant circuit a separate coolant circuit.

When the refrigerating power demand is moderate for the air conditioning of the passenger compartment and passive battery cooling, the front evaporator and/or the rear evaporator are operated in the refrigerant circuit. The heat of condensation from the refrigerant circuit is transferred partly across the ambient heat exchanger to the ambient air. The waste heat from the E-drivetrain coolant circuit and from the battery cooler switched in parallel with the drivetrain is given off across the series-connected AC coolant radiator and the drivetrain coolant radiator to the ambient air. The coolant circuit is connected from the 3/2-way valve across the 4/2-way valve, the condenser and the AC coolant radiator to the 3/2-way valve as a branching point for the drive cooling channel and the battery cooling channel.

Advantageously, during passenger compartment heating and battery heating and when the refrigerating power demand is moderate for the active E-drivetrain cooling, the chiller is operated in the refrigerant circuit. The heat of condensation from the refrigerant circuit is given off to the refrigerant heating heat exchanger for the heating of the passenger compartment and further heat of condensation is surrendered across the ambient heat exchanger to the ambient air. The battery cooler is connected to the heating device in a separate circuit to the battery heating.

During passenger compartment heating in a boost mode and passive E-drivetrain heating as well as active battery cooling, the waste heat from the refrigerant circuit is given off to the refrigerant¬heating heat exchanger. The battery coolant circuit is connected to the battery cooler and the chiller. The E-drivetrain coolant circuit is connected in the circuit with passive self-heating across a bypass.

Preferably, during intensive passenger compartment heating and passive E-drivetrain heating, the waste heat from the refrigerant circuit is given off to the refrigerant heating heat exchanger. The battery coolant circuit is connected to the chiller and the heating device and heats the coolant, while the battery cooler receives no flow after the 3/2-way valve and the coolant is taken in a bypass to the battery cooler. The E-drivetrain coolant circuit is connected in the circuit with passive self-heating across a bypass.

The concept of the invention consists in that the separation of the coolant circuits results in different flow sequences of the components.

In combination with an additional 3/2-way valve behind the drivetrain coolant radiator it is now possible to switch the valves in such a way that the electrical drivetrain is no longer in the same coolant circuit as the radiators. In this way, the entire heat transfer surface of the radiators on the ambient side is available to the refrigerant circuit as a heat sink. This mode of operation is especially advantageous when the vehicle is operating at standstill and at the same time quick charging of the traction battery is taking place. The drivetrain is not being cooled in this case, but only has flow in a small circuit in order to maintain the homogenization function of the coolant.

In the battery cooling circuit an additional bypass channel is provided with additional valves. Thanks to this expansion, the battery homogenization function can be maintained in heat pump mode, without removing heat from the traction battery, while at the same time heat can be removed from the drivetrain. This function is advantageous when the traction battery should not be cooled further on account of thermal stability, yet still heat is needed in order to efficiently provide the heating power for the passenger compartment.

In heating mode, a refrigerant heating heat exchanger, also known as an internal condenser, is used instead of a coolant heat exchanger in order to heat the air flowing into the passenger compartment. This does away with the need to always have to use the coolant/refrigerant heat exchanger, the condenser. On the whole, this results in a more efficient operation and enables a more effective passive battery cooling when needed at mild ambient temperatures of 10° C. to 20° C., when a lot of waste heat needs to be given off from the traction battery and the drivetrain directly to the surroundings and the refrigerant circuit can no longer be used for this.

The benefits of the invention are that the direction of flow through the heat exchangers is optimal during operation in standstill of the vehicle with quick charging of the traction battery at the same time, when the 4/2-way valve is switched in such a way that both the refrigerant/air heat exchanger ("subcooler") and the coolant/air heat exchanger ("radiator") are available as heat sinks for the refrigeration circuit.

At the same time, it is advantageous that the drivetrain does not also have to be cooled constantly when there is no need for this. This saves on cooling capacity, which can be used for the air conditioning of the traction battery or the passenger compartment.

In heating mode, when heat is to be removed via the chiller from both the traction battery and from the drivetrain, there is the added benefit that further heat can be removed under thermal stability. In the prior art, no heat may be removed from the drivetrain at such a time.

It is also advantageous that the heat in heating mode is routed into the passenger compartment by means of a refrigerant/air heat exchanger. The providing of heat is further optimally energy-efficient thanks to the direct injecting of the heat from the refrigerant circuit.

BRIEF DESCRIPTION OF THE DRAWINGS

Further details, features and benefits of the invention will emerge from the following description of exemplary embodiments making reference to the accompanying drawings. There are shown.

DETAILED DESCRIPTION OF THE EMBODIMENTS

Figure 1:
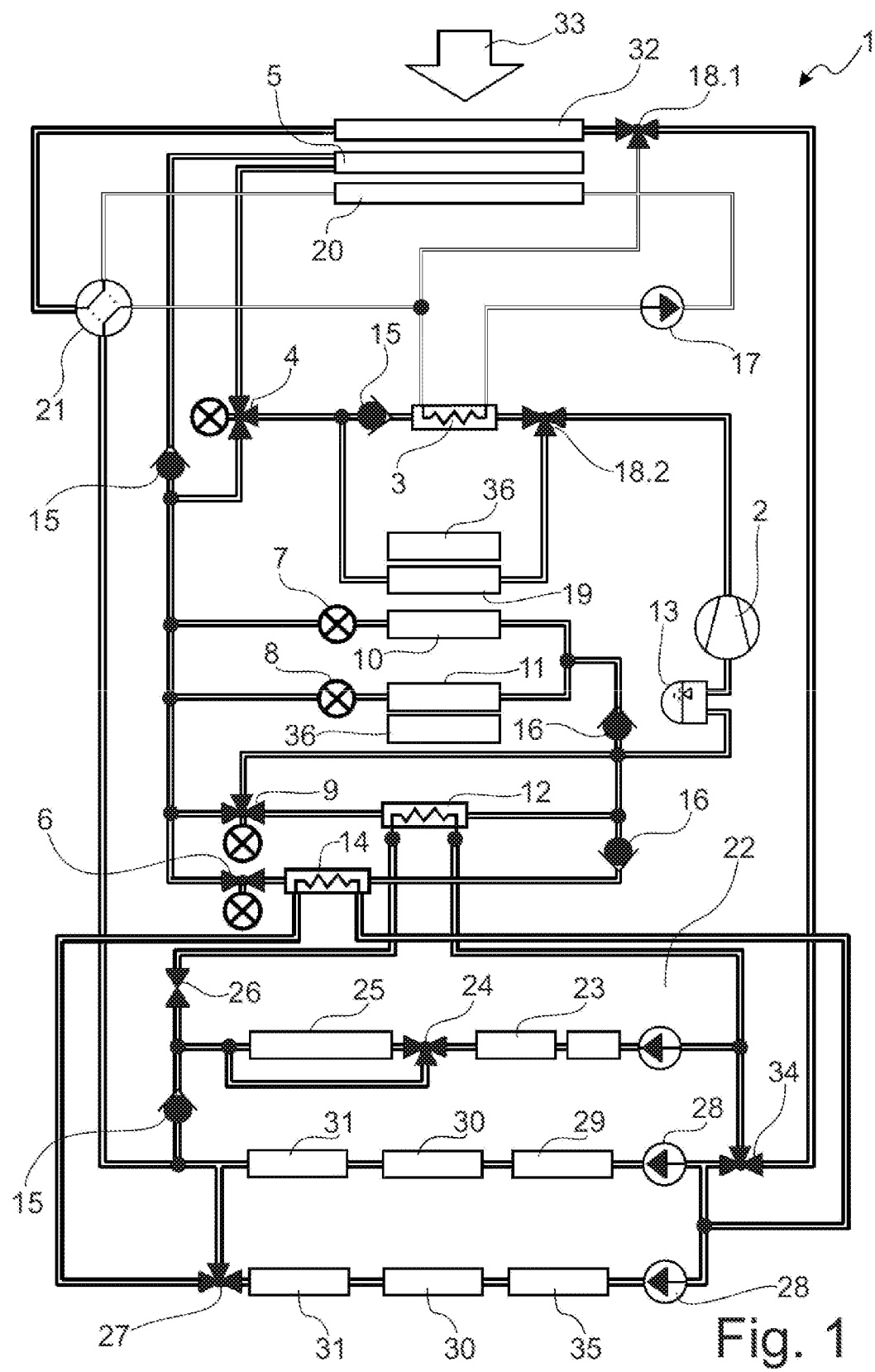
FIG. 1: diagram of the air conditioning and battery cooling assembly with two chillers.

FIG. 1 shows an air conditioning and battery cooling assembly 1 with two chillers 12 and 14 in a diagram with all essential components as well as optional circuit connections. The overall thermal system made up of the combination of coolant and refrigerant circuits has a heat pump functionality, besides the refrigeration functionality. By this is meant that both heat and cold can be provided for the vehicle with the air conditioning and battery cooling assembly.

The system consists of two coolant circuits and one refrigerant circuit, and the coolant circuits can be coupled together.

The A/C coolant circuit is represented in a thin double line.

The refrigerant circuit is represented in a double line of medium line thickness. The E-drivetrain coolant circuit, which contains the battery cooling circuit, is represented in a thick double line.

In the circuit arrangements with different operating states, channels not being operated are represented in a single thin line.

For the coupling of the coolant circuits, there is provided a 4/2-way coolant valve 21, in order to combine the A/C coolant circuit and the E-drivetrain coolant circuit in a single large serial circuit or also to separate them entirely from each other.

Thanks to the serial coupling of partial channels of the A/C coolant circuit to the E-drivetrain coolant circuit, the drivetrain coolant radiator 32 can be used in addition to the A/C coolant radiator 20 and the ambient heat exchanger 5 of the refrigerant circuit for the surrendering of the heat of condensation to the ambient air 33. Furthermore, the E-drivetrain components, such as the inverter 29, converter 30, E-engine heat exchanger 31, are used as heat stores, in order to store a certain amount of waste heat from the refrigeration system during standstill. This temporarily stored heat can later be given off to the surroundings when the coolant circuits are fully separated during driving operation.

In heating mode, in the heat pump operation, the temporarily stored heat or the waste heat from the E-drivetrain components can be used as a heat source for the evaporation of the refrigerant and this heat can thereby be made available to the system for the heating. In this way, the overall thermal system of the air conditioning and battery cooling assembly can provide high heating and cooling performance in a very efficient manner.

The refrigerant circuit consists of the compressor 2 and the condenser 3, to which the refrigerant heating heat exchanger 19 is hooked up in parallel across the 3/2-way valve 18.2. A check valve 15 behind the condenser 3 prevents the movement of refrigerant into the condenser 3 when the latter has no flow through it.

The expansion element 4 is at the same time a 3/2-way valve and a branching point to the ambient heat exchanger 5 and alternatively directly to the evaporators 10 and 11. The return of the refrigerant from the ambient heat exchanger 5 occurs across a check valve 15 to the parallel-switched evaporators 10 and 11 as well as to the parallel-switched chillers 12 and 14 with the associated expansion elements 6, 7, 8 and 9. The expansion element 9 is at the same time a 3/2-way valve and it enables a bypassing of the refrigerant to the chillers 12 and 14 as well as the evaporators 10 and 11. The refrigerant returns via the low pressure collector 13 to the compressor 2 and the circuit is closed.

The first chiller 12 forms a battery coolant channel with a coolant pump 22, a heating device 23, a 3/2-way valve 24, the battery cooler 25 and a shutoff valve 26. By the 3/2-way valve 24, a bypass to the battery cooler 25 can be organized. The battery coolant channel is connected across a 3/2-way valve 34 to the E-drive coolant channel. A check valve 15 prevents a flow of coolant from the E-drivetrain coolant circuit into the battery coolant channel after the E-engine heat exchanger 31.

The second chiller 14 is shown in a parallel channel of the refrigerant circuit to the first chiller 12 with its own expansion element 6. On the coolant side in the E-drivetrain, the chiller 14 is represented by a 3/2-way valve 27 as a merging of the parallel coolant channels for front and rear drive heat exchangers, also known as E-engine heat exchanger 31, and a corresponding branching point, not otherwise indicated. One coolant pump 28 is arranged in each E-drive coolant channel.

A refrigerant heating heat exchanger 19 is provided for the heating of the passenger compartment and auxiliary heating devices 36 are provided for the rear evaporator 11.

The coolant 4/2-way valve 21 has four coolant connections. One connection goes to the E-drivetrain coolant circuit. One connection goes to the inlet of the drivetrain coolant radiator 32.

Another connection goes to the outlet of the A/C coolant radiator 20 and the last connection goes to the inlet of the condenser 3.

Furthermore, an additional coolant 3/2-way valve 18.1 is situated after the drivetrain coolant radiator 32 in the flow direction. From the 3/2-way valve 18.1, the coolant channel can be led to the inlet of the condenser 3.

Thanks to this arrangement of the 4/2-way valve 21 and the coolant 3/2-way valve 18.1, it is possible to optimize the flow through the heat exchanger on the air side when the vehicle is parked during the quick charging function of the traction battery and thus at higher required cooling capacity at the same time as low air mass flow forming a heat sink, as well as to prevent heat from being removed from the drivetrain.

In the refrigeration circuit, the additional parallel-connected chiller 14 including the expansion element 6 and the check valve 16 is available.

The additional chiller 14 is hooked up and arranged in such a way that the drivetrain during heating mode can be utilized via the additional chiller 14 as a heat source separate from the traction battery, and thus in particular the temperature levels on the coolant side are no longer tied together.

The refrigerant heating heat exchanger 19 is provided as an internal condenser instead of the otherwise typical coolant/air heat exchanger.

A refrigerant 3/2-way valve 18.2 is introduced into the refrigerant circuit in order to distinguish between the flow through the internal condenser and the water-cooled condenser 3.

Thanks to these arrangements, a direct transfer of heat from the refrigerant to the air flowing into the passenger compartment is possible.

Figure 2:
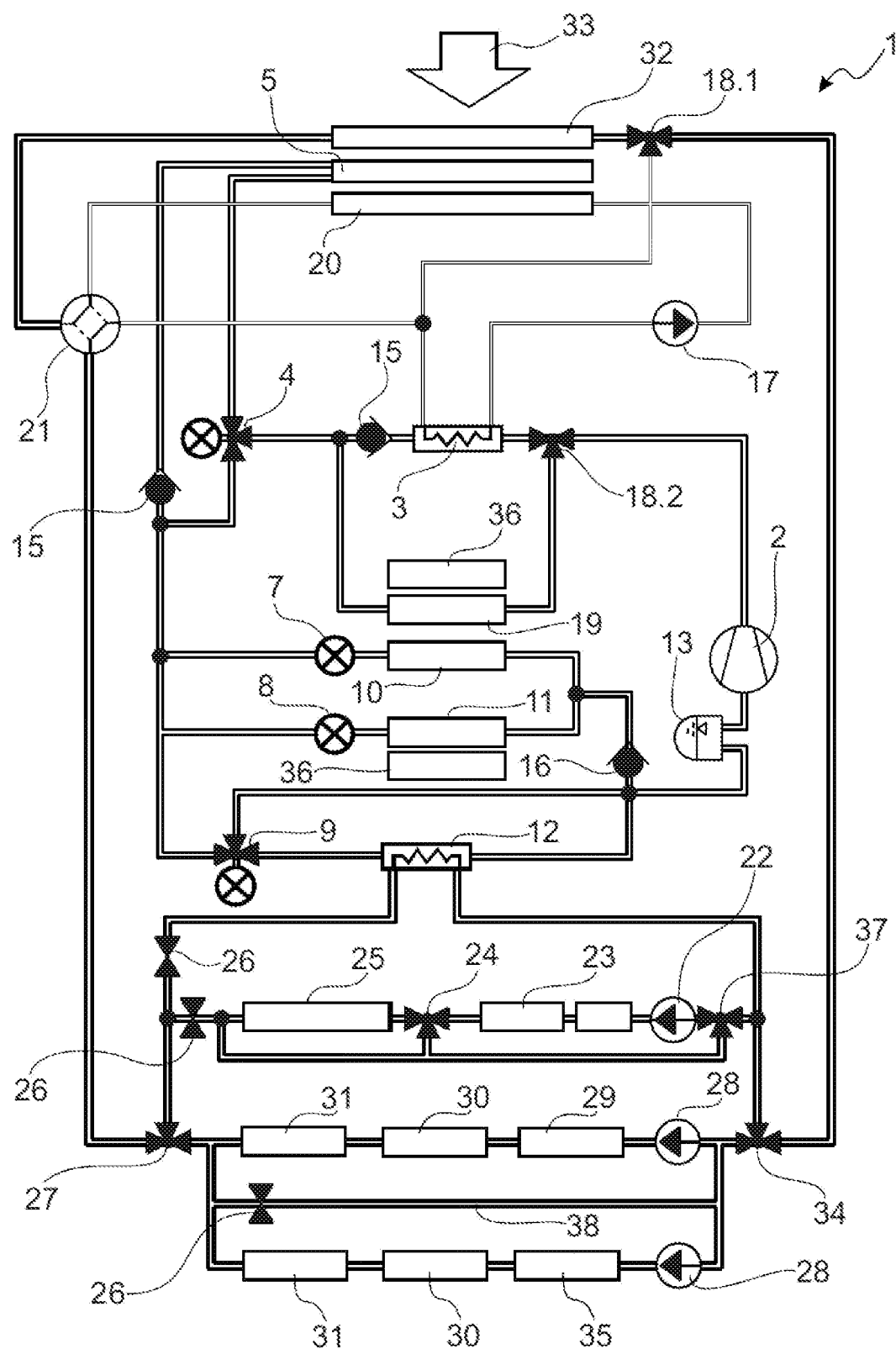
FIG. 2: diagram of the air conditioning and battery cooling assembly with one chiller.

The air conditioning and battery cooling assembly 1 of FIG. 2 differs from the air conditioning and battery cooling assembly 1 shown in FIG. 1 only in regard to the following described features. There are two coolant 3/2-way valves arranged in the coolant battery circuit. One 3/2-way valve 24 is placed between the battery cooler 25 and the heating device 23, the electrical coolant heater. The second 3/2-way valve 37 is located in front of the coolant pump 22, also known as the battery pump.

Furthermore, an additional coolant channel is provided, which connects the two 3/2-way valves 37 and 24 together. Thanks to these modifications, it is possible in heating mode, when no heat should be removed from the battery, to completely separate the battery cooling circuit from the E-drivetrain cooling circuit and at the same time to remove heat from the E-drivetrain by means of the chiller 12, while no heat is removed from the battery circuit. A separate battery coolant circuit can be hooked up without a connection to the E-drivetrain coolant circuit and the continual flow of coolant through the traction battery cooler thus occurs via the coolant pump 22, the heating device 23, the 3/2-way valve 24 and the battery cooler 25 back to the 3/2-way valve 37, where the circuit is closed.

A further difference from the air conditioning and battery cooling assembly 1 of FIG. 1 is that the E-drivetrain coolant circuit and the refrigerant circuit have no second chiller. According to the circuit arrangement of FIG. 2, only the chiller 12 is provided for the coupling of refrigerant circuit and battery coolant channel as well as E-drive coolant channel.

The refrigerant circuit without the parallel channel for the additional chiller is identical to the refrigerant circuit of FIG. 1. The A/C coolant circuit is also identical in configuration. The condenser 3 is tied in on the coolant side and is connected via a coolant pump 17 to the A/C coolant radiator 20. From the A/C coolant radiator 20, the outlet is connected to the 4/2-way valve 21, which is fluidically connected by a node point to the coolant inlet of the condenser 3. In the A/C coolant circuit, a channel is provided from the condenser inlet to the coolant 3/2-way valve 18.1, which connects the A/C coolant circuit at the outlet of the drivetrain coolant radiator 32 to the E-drivetrain coolant circuit.

In the refrigerant circuit, the refrigerant heating heat exchanger 19 and the condenser 3 are connected in parallel by the refrigerant 3/2-way valve 18.2 as a manifold. Coming next in the refrigerant circuit after the merging of the parallel channels is the expansion element 4 with the functionality of a 3/2-way valve. This is connected on one side to the ambient heat exchanger 5 and on the other side to the refrigerant channel for the supplying of the evaporators 10 and 11 for the cooling of the passenger compartment. At the evaporators 10 and 11 there are also provided auxiliary heating devices 36 on the air side, which can additionally heat the passenger compartment in heating mode, preferably by electric heating. PTC heating elements are used preferably as the auxiliary heating devices.

In parallel with the evaporators 10, 11 there is arranged the chiller 12, which is tied into the refrigerant circuit across an expansion element 9, also having a 3/2-way valve functionality. Furthermore, a bypass line is provided at the expansion element 9 across a node point for connection of the parallel channels and to the low-pressure collector 13 and from this to the compressor 2. The E-drivetrain coolant circuit starting from the 4/2-way valve 21 is connected to the drivetrain coolant radiator 32, then to the 3/2-way valve 18.1, and the latter to the 3/2-way valve 34. This is where the sub-distribution occurs into the battery coolant channel and to the chiller 12. The remaining port of the 3/2-way valve 34 is connected to the E-drive coolant channel, which in turn comprises parallel channels for front and rear E-engine heat exchanger 31 and an upstream converter 30 and inverter 29, as well as a coolant pump 28. Furthermore, a bypass 38 to the heat exchangers 29, 30, 31 and 35, 30, 31 of the E-drive coolant channel is organized, which can be switched in across a shutoff valve 26. Thanks to this additional bypass option, a circuit can be organized separately only across the heat exchangers of the immediate E-drive coolant channel, being decoupled from the radiators 20, 5, 32. This is advantageous, for example, for operating states in which the cooling capacity of the radiators 20, 5, 32 is prioritized for other cooling purposes.

The following description of FIGS. 3 to 8 explains the basic operating modes of the air conditioning and battery cooling assembly 1 of FIG. 2, with which the system can be operated in specific basic task layouts. Of course, combinations of the described modes are possible for particular constellations.

Fluidic connections which can receive a flow of fluid within the individual modes are represented as a double line. Single lines receive no flow of fluid in the particular mode.

Figure 3:
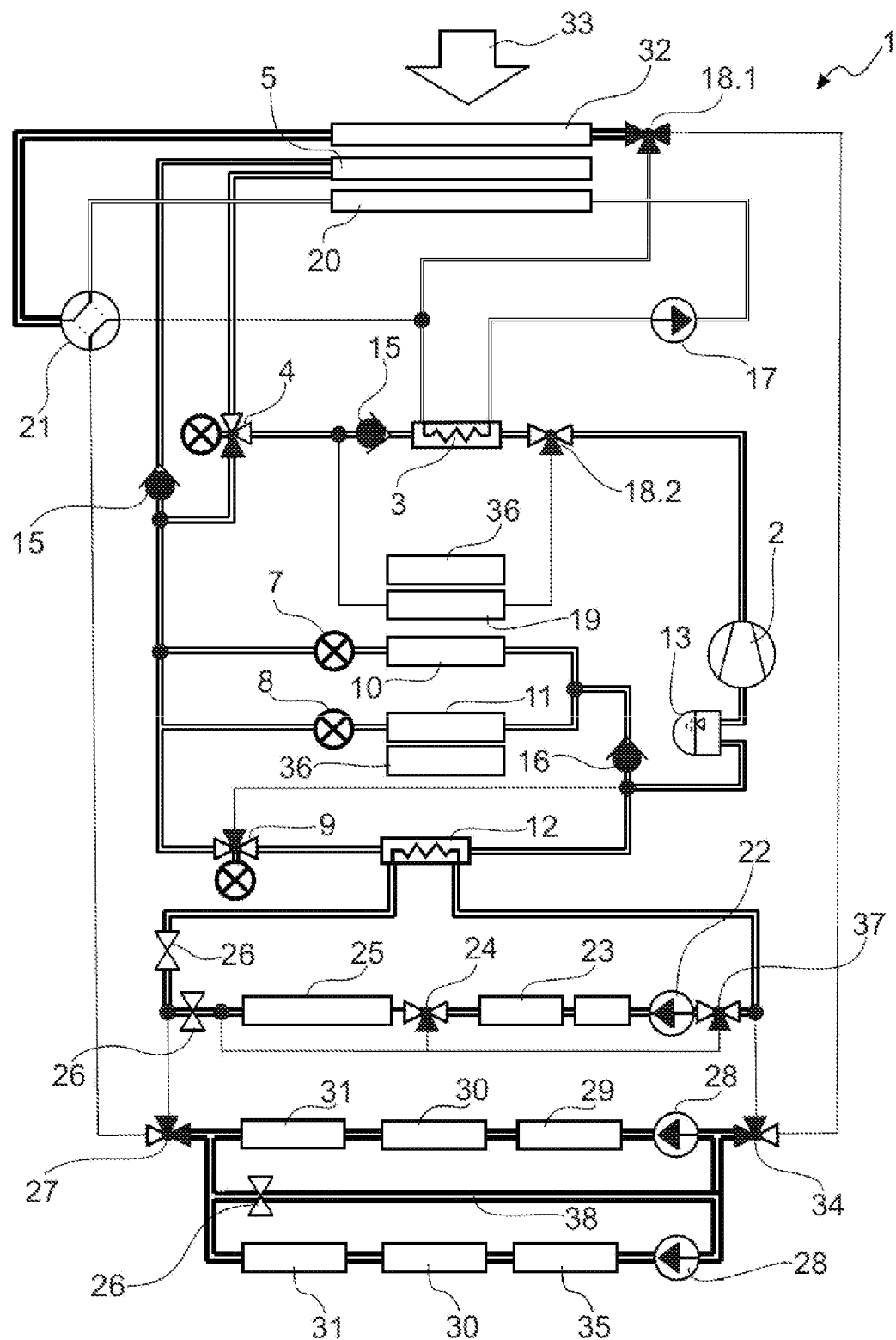
FIG. 3: flow diagram of the refrigerating power demand during quick charging at high temperatures.

FIG. 3 shows the flow diagram of an air conditioning and battery cooling assembly 1 of FIG. 2 during a quick charging of the battery at relatively high ambient temperatures, such as from 25° C. to 45° C. During quick charging of the batteries, a high cooling capacity is required in order to avoid overheating and consequent impairment of the batteries. For this reason, the chiller 12 with corresponding expansion element 9 is operated as a priority in the refrigerant circuit. Refrigerant may be additionally provided for the evaporators 10 and 11 to cool the passenger compartment. After the compression of the refrigerant vapor in the compressor 2, the refrigerant 3/2-way valve 18.2 is switched in the direction of the condenser 3. The condenser 3 on the coolant side of the A/C coolant circuit surrenders the waste heat of condensation to the ambient air 33 in the A/C coolant radiator 20, after which the coolant is taken across the 4/2-way valve 21 into the serially connected drivetrain coolant radiator 32 and the coolant once again gives off heat to the ambient air 33. The cooled-down coolant then goes across the coolant 3/2-way valve 18.1 and returns to the coolant-side inlet of the condenser 3. The coolant circuit is driven by the coolant pump 17.

The refrigerant cooled in the condenser 3 goes across the expansion element 4 to the ambient heat exchanger 5, where the refrigerant once again surrenders heat to the ambient air 33 and is condensed or supercooled. The refrigerant then goes across the check valve 15 to the individual parallel refrigerant channels for the front compressor 10 with corresponding expansion element 7, the rear evaporator 11 with corresponding expansion element 8, and the chiller 12 with corresponding expansion element 9, where each time the refrigerant is evaporated as needed and as regulated, taking up heat.

The chiller 12 at the coolant side is tied into a battery coolant circuit, which is driven by the coolant pump 22. The coolant flows across the heat exchanger of the heating device 23, which is not heated in this constellation, and across the 3/2-way valve 24 into the battery cooler 25, where the waste heat of the quick charging is taken up by the coolant flow. The circuit of the battery coolant flow to the chiller 12 is closed across the opened shutoff valve 26 and the circuit is closed. The 3/2-way valve 37 switches the connection from the chiller 12 to the coolant pump 22 in this circuit layout per FIG. 3.

The E-drivetrain is not cooled in this configuration but rather circulates via the bypass 38 as a small closed circuit. The coolant pumps 28 drive the coolant flow across the heat exchangers 29, 30, 31 and 35, 30, 31 and across the opened shutoff valve 26 the circuit is produced via the bypass 38. The parallel E-drivetrain coolant channels are bounded at the end by two 3/2-way valves 34 and 27, which are switched appropriately for the organizing of the coolant circuit. The outer channels of the two 3/2-way valves 34 and 27 to the 4/2-way valve 21 and to the 3/2-way valve 18.1 are respectively blocked.

In this mode, the three radiators 5, 20, 32, i.e., the air heat exchangers, are utilized as a waste heat sink for the cooling of the battery and the passenger compartment, while the A/C coolant radiator 20 and the drivetrain coolant radiator 32 are hooked up in series.

Figure 4:
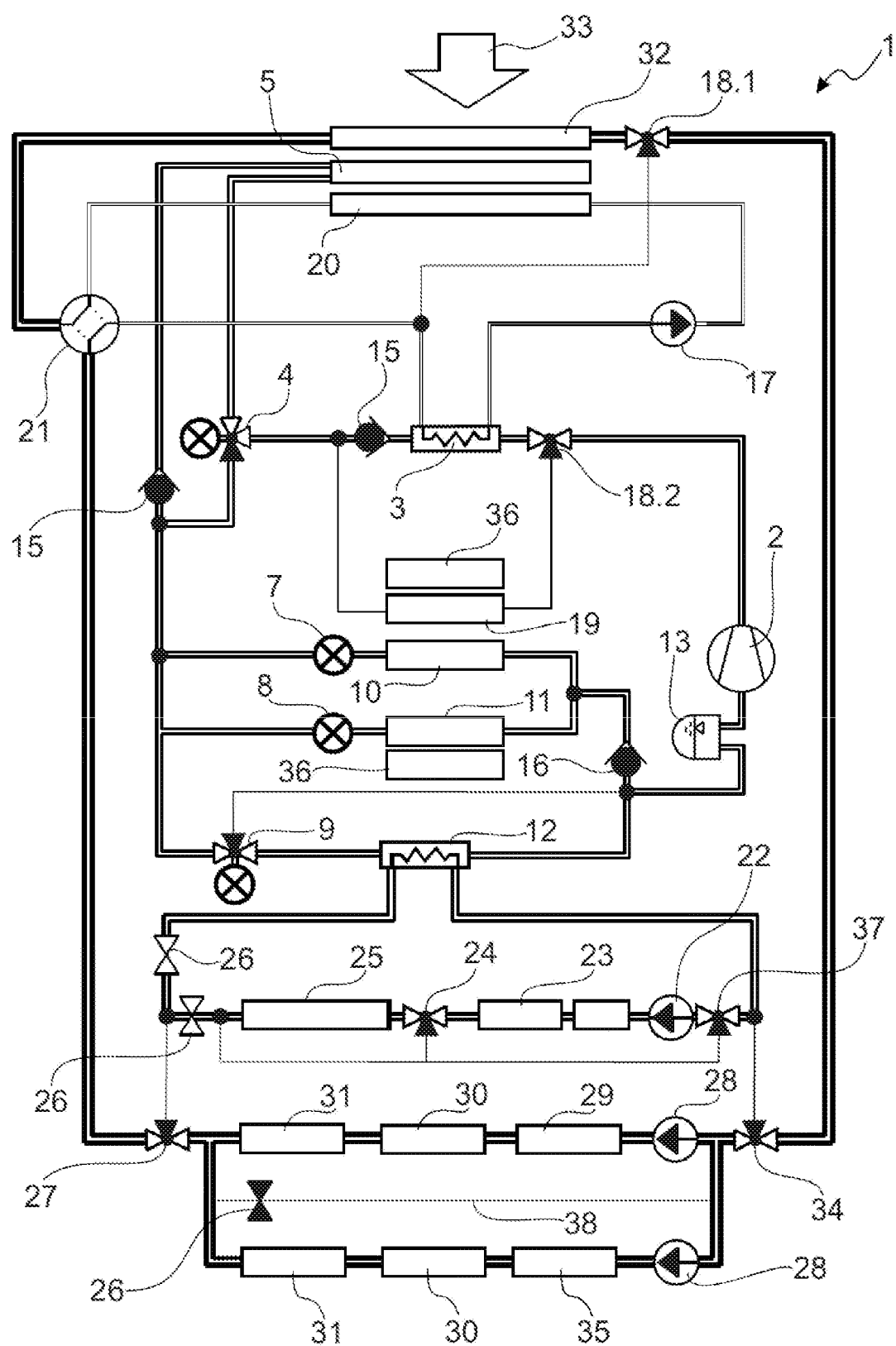
FIG. 4: flow diagram at high refrigerating power demand for the air conditioning of the passenger compartment and the cooling of the E-drivetrain.

FIG. 4 shows a flow diagram of the air conditioning and battery cooling assembly 1 of FIG. 2 with heavy load on the drivetrain due to high speed and at the same time high refrigerating power demand for the cooling of the passenger compartment at high temperatures.

The E-drivetrain coolant circuit is switched across the 3/2-way valve 34 and the coolant pumps 28 deliver the coolant through the heat exchangers 29, 30, 31 and 35. The two parallel coolant channels for the front and the rear heat exchangers are merged in the 3/2-way valve 27 and then taken across the 4/2-way coolant valve 21 to the drivetrain coolant radiator 32. Here, the waste heat from the drivetrain is transferred to the ambient air 33 and the cooled coolant goes across the 3/2-way valve 18.1 to the 3/2-way valve 34, where the circuit of the E-drivetrain coolant circuit is closed in this operating mode. The electric drivetrain is thus passively cooled solely via the drivetrain coolant radiator 32 and it has no connection to the refrigerant circuit of the vehicle.

The refrigerant circuit of the vehicle also supplies the chiller 12, responsible for the battery cooling, in addition to the evaporators 10 and 11 for the cooling of the passenger compartment.

The battery cooling circuit is switched from the battery cooler 25 across the opened shutoff valve 26 to the chiller 12 and from there across the 3/2-way valve 37, the coolant pump 22, through the nonfunctioning heating device 23 and the 3/2-way valve 24 and finally to the battery cooler 25.

Hence, the battery cooling circuit in this operating mode is decoupled from the E-drivetrain coolant circuit.

The refrigerant circuit after the compressor 2 is switched across the 3/2-way valve 18.2 to the condenser 3 and across the check valve 15 and the expansion element 4 to the ambient heat exchanger 5. In this operating mode, on the coolant side, the A/C coolant circuit is utilized for the dissipation of the heat of condensation from the refrigerant circuit across the AC coolant radiator 20 and also in parallel heat of condensation is given off across the ambient heat exchanger 5 of the refrigerant circuit to the ambient air 33.

In the operating mode of FIG. 4, the battery cooling and the cooling of the passenger compartment are operated actively via the refrigerant circuit, whereas the E-drivetrain cooling is realized passively only via the drivetrain coolant radiator 32.

Figure 5:
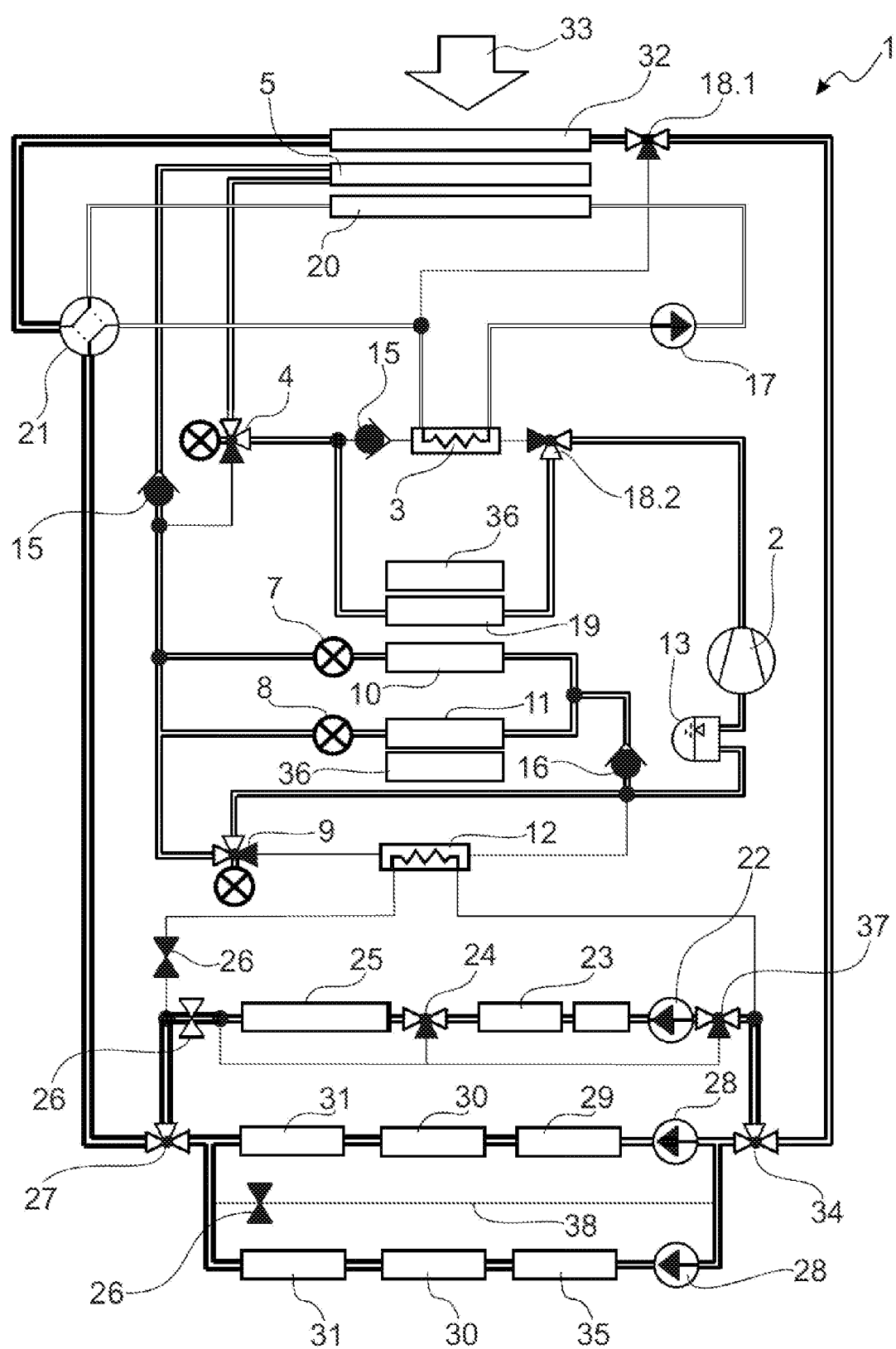
FIG. 5: flow diagram at moderate refrigerating power demand for the air conditioning of the passenger compartment, with passive E-drivetrain cooling and passive battery cooling.

FIG. 5 shows a flow diagram of the air conditioning and battery cooling assembly 1 of FIG. 2 with heavy load on the E-drivetrain coolant circuit due to high speed of the vehicle and passive battery cooling at moderate temperatures of 10° C. to 20° C.

The battery cooling and the E-drivetrain cooling occur passively across the E-drivetrain coolant circuit, which leads the channels for the cooling of the battery and the drives in parallel and then combines them across the 4/2-way valve 21 and the nonfunctioning condenser 3, supported by the coolant pump 17, at first to the A/C coolant radiator 20, where the first portion of the waste heat is given off to the ambient air 33. After this, the coolant flow goes across the 4/2-way valve 21 to the drivetrain coolant radiator 32, where the second portion of the waste heat is given off to the ambient air 33. The E-drivetrain coolant circuit is closed across the 3/2-way valve 18.1 to the 3/2-way valve 34, where the distribution of the coolant flow to the battery cooling channel or the E-drive channels occurs.

In this mode, the passenger compartment is air conditioned in the usual way by the refrigerant circuit across the evaporators 10 and 11, and any heat needed at these moderate ambient temperatures can be given off to the passenger compartment across the refrigerant heating heat exchanger 19 as an internal condenser, or the heat can be given off to the ambient air 33 across the expansion element 4 with 3/2-way functionality to the ambient heat exchanger 5.

Figure 6:
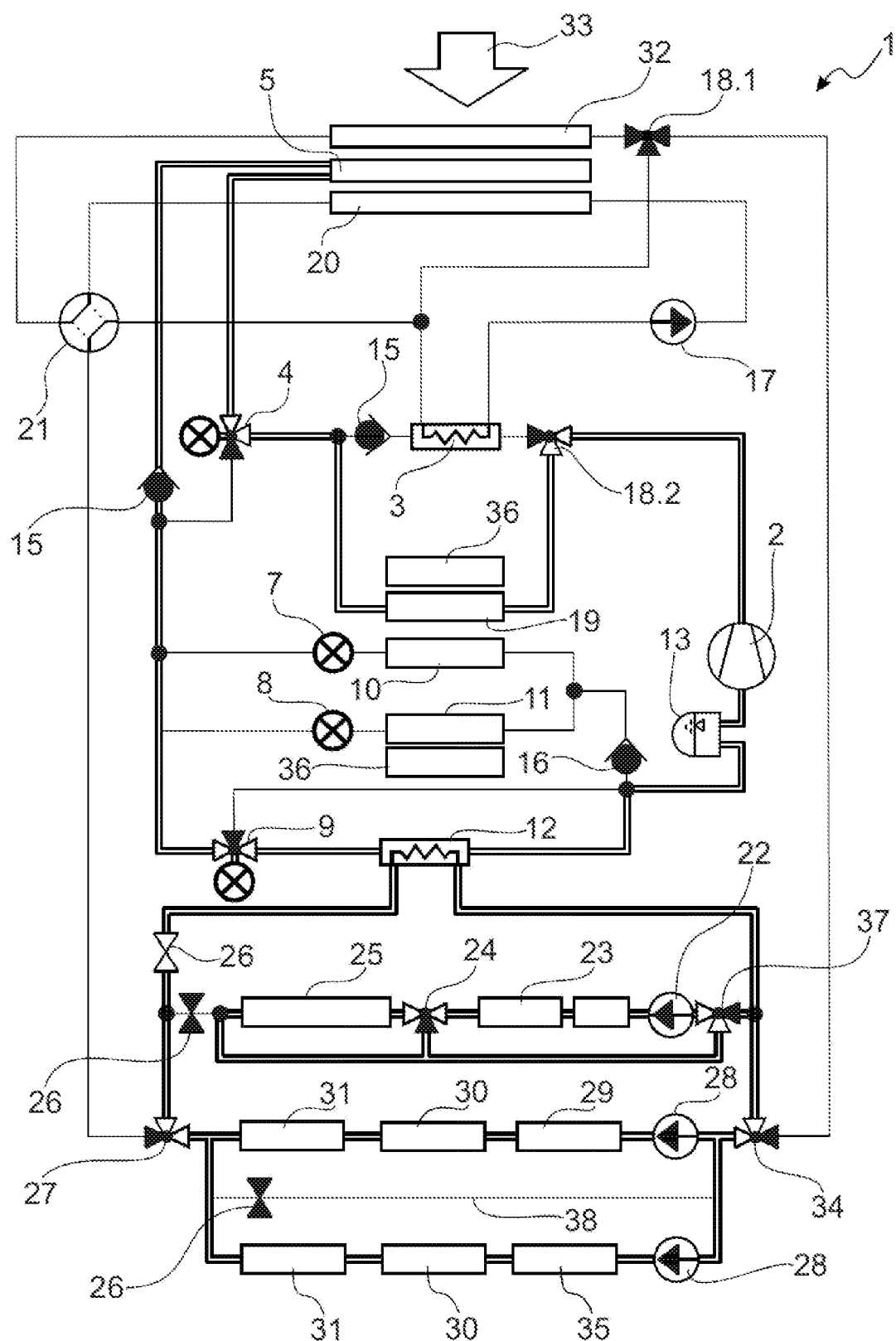
FIG. 6: flow diagram during passenger compartment heating and battery heating and at moderate refrigerating power demand for the active E-drivetrain cooling.

FIG. 6 shows the flow diagram of the passenger compartment heating at low ambient temperatures and cold components not yet at the operating temperatures.

At low ambient temperatures, the evaporators 10 and 11 in the refrigerant circuit are not yet supplied with refrigerant and only the chiller 12 is switched for the uptake of heat in the refrigerant circuit. The refrigerant circuit works in normal manner across the compressor 2 to the 3/2-way valve 18.2 to the refrigerant heating heat exchanger 19, where the heat of condensation is given off to the passenger compartment. Finally, the remaining heat of condensation is given off across the combined expansion 3/2-way valve 4 in the ambient heat exchanger 5 and the circuit to the chiller 12 is closed.

The chiller 12 draws heat from the E-drivetrain on the coolant side. The coolant flow is from the E-drivetrain across the 3/2-way valve 27 and the opened shutoff valve 26 to the chiller 12 and then the coolant goes across the 3/2-way valve 34 to the parallel E-drivetrain coolers 29, 30, 31, 35. Each time the coolant is moved by the coolant pumps 28.

The battery is not cooled in this mode, but rather it is heated passively and/or actively to the operating temperature. This occurs in a separate circuit, which is switched from the coolant pump 22 across the heating device 23, which may also give off additional heat to the coolant flow. The coolant flow is delivered across the 3/2-way valve 24 to the battery cooler 25, which in this operating mode heats the battery, however. The return flow of the coolant occurs across a bypass, the 3/2-way valve 37 being switched accordingly so that the coolant circulates in this small circuit. A shutoff valve 26 bounds off or blocks the battery cooling circuit toward the E-drivetrain cooling circuit.

Figure 7:
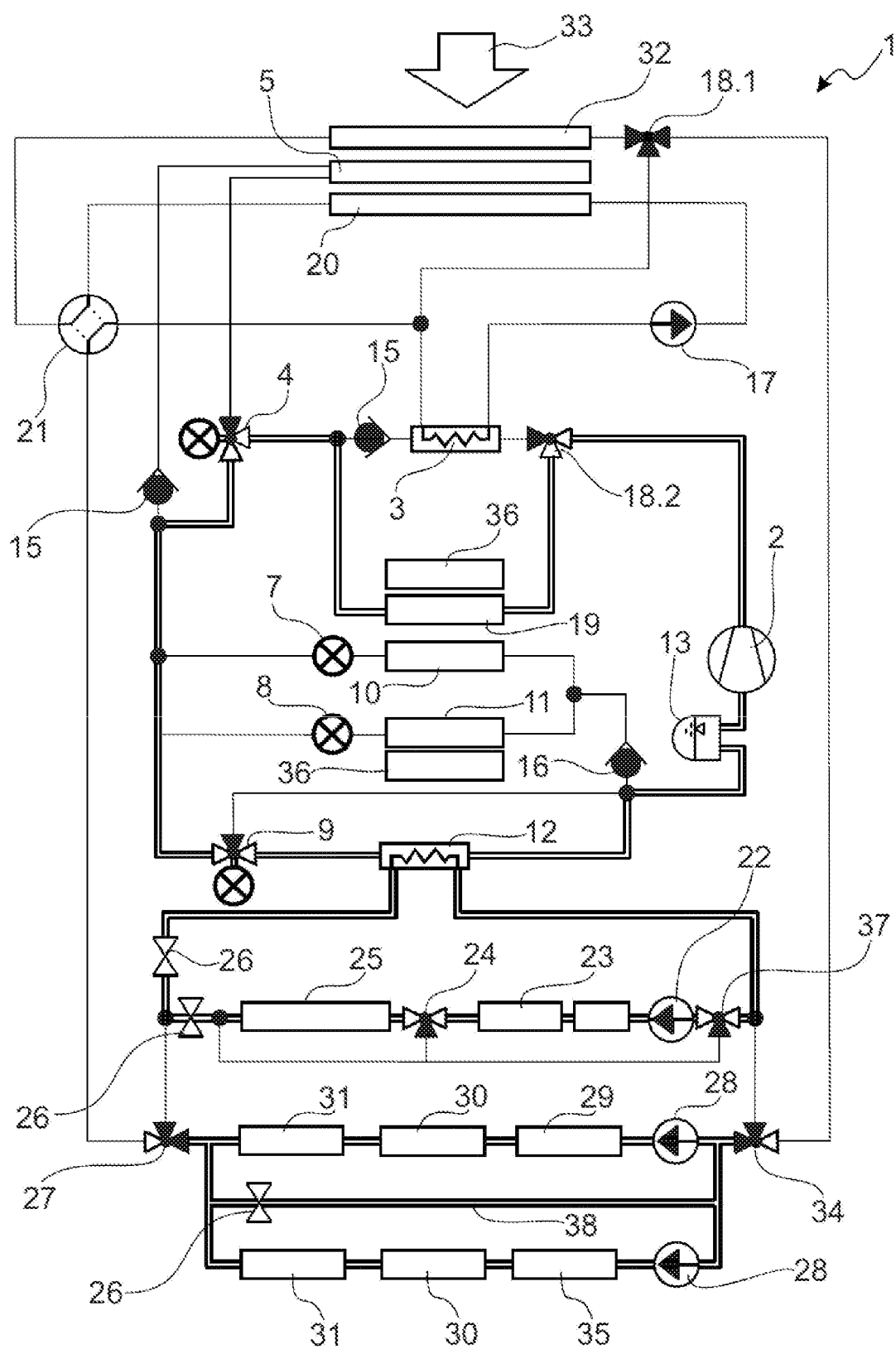
FIG. 7: flow diagram during passenger compartment heating and passive E-drivetrain heating and active battery cooling.

FIG. 7 shows the flow diagram of the air conditioning and battery cooling assembly 1 of FIG. 2 in heating operation with the battery already air conditioned.

The refrigerant circuit in this mode is operated to heat the passenger compartment. Hence, the hot refrigerant gas from the compressor 2, coming across the 3/2-way valve 18.2, is condensed entirely in the refrigerant heating heat exchanger 19 as an internal condenser and possibly supercooled, and the heat of condensation is given off to the passenger compartment for its heating. After this, the condensed refrigerant goes across the expansion element 4 and the expansion element 9 to the chiller 12 for heat uptake, after which the refrigerant gas is taken to the low pressure collector 13 and then to the compressor 2.

The heat for the evaporation of the refrigerant in the chiller 12 comes from the battery cooler 25 on the coolant side, being tied into the battery cooling circuit across the opened shutoff valves 26, the chiller 12 and the 3/2-way valve 37 and the coolant pump 22 to the battery cooler 25.

The E-drivetrain is operated in a short circuit in this mode, similar to the mode in FIG. 3, after which the bypass 38 is switched, with opened shutoff valve 26, and the coolant pumps 28 deliver the coolant across the heat exchangers 29, 30, 31 and in parallel 35, 30, and 31 for the front and the rear drivetrain.

Figure 8:
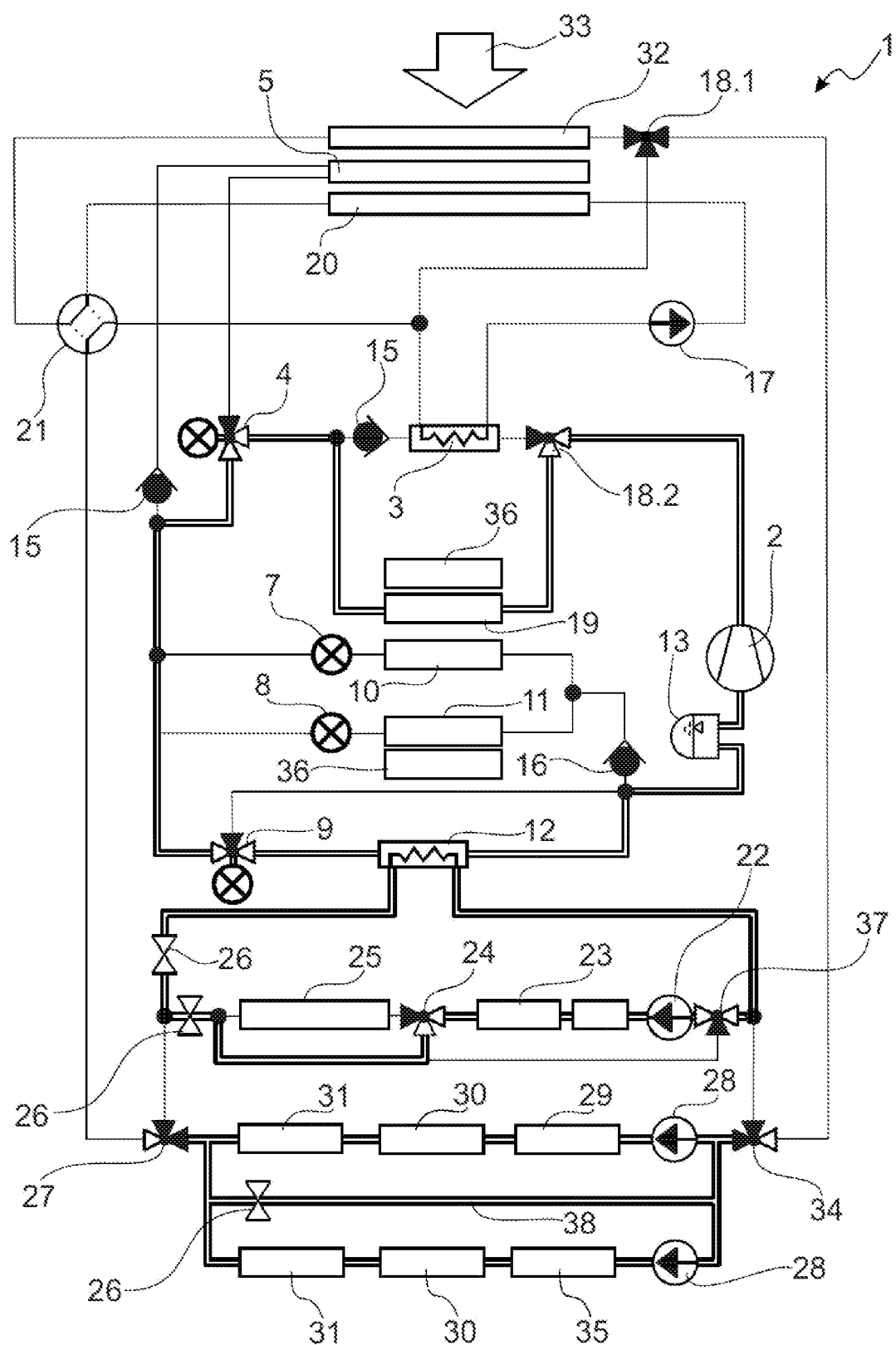
FIG. 8: flow diagram during intensive passenger compartment heating and passive E-drivetrain heating.

FIG. 8 shows the flow diagram of the air conditioning and battery cooling assembly 1 of FIG. 2 in the so-called boost mode for especially intensive heating of the passenger compartment.

For the intensive heating of the passenger compartment, the additional heating device 23 is activated in the battery coolant circuit, whereupon the battery cooler 25 is bypassed across the 3/2-way valve 24. The coolant is taken to the chiller 12 across the shutoff valves 26 in the opened position, after which the circuit is again closed across the 3/2-way valve 27 to the coolant pump 22 to the heating device 23.

The heat of the battery coolant circuit is taken up in the chiller 12 by the refrigerant on the refrigerant side and after the compressor 2 in the refrigerant¬heating heat exchanger 19 it is given off to the passenger compartment. Due to appropriate switching of the 3/2-way valve 18.2, only the refrigerant heating heat exchanger 19 and not the condenser 3 is subjected to the hot refrigerant vapor, so that all of the heat of condensation can be given off to the passenger compartment. After this, the liquid refrigerant is taken once more to the chiller 12 across the 3/2-way valve and the expansion element 4 as well as the expansion element 9, where the refrigerant is evaporated, taking up heat from the heating device 23, and the refrigerant circuit is closed toward the low-pressure collector 13 and toward the compressor 2. Once again, the E-drivetrain coolant circuit is short circuited, similar to the modes represented and described in FIG. 7 and FIG. 3.

LIST OF REFERENCE NUMBERS

1 Air conditioning and battery cooling assembly
2 Compressor
3 Condenser
4 Expansion element
5 Ambient heat exchanger OHX
6 Expansion element
7 Expansion element
8 Expansion element
9 Expansion element
10 Front evaporator
11 Rear evaporator
12 Chiller
13 Low pressure collector
14 Auxiliary chiller
15 Check valve
16 Check valve
17 Coolant pump
18.1 Coolant 3/2-way valve, 18.2 Refrigerant 3/2-way valve
19 Refrigerant heating heat exchanger/internal condenser
20 A/C coolant radiator
21 4/2-way coolant valve
22 Coolant pump
23 Heating device
24 3/2-way valve
25 Battery cooler
26 Shutoff valve
27 3/2-way valve
28 Coolant pump
29 Inverter
30 Converter
31 E-engine heat exchanger
32 Drivetrain coolant radiator
33 Ambient air
34 3/2-way valve
35 Charger
36 Auxiliary heating device
37 3/2-way valve
38 Bypass

What is claimed is:

1. An air conditioning and a battery cooling assembly comprising:
an A/C coolant circuit and a coolant circuit, as well as a refrigerant circuit, wherein:
the A/C coolant circuit and the coolant circuit are coupled together across a 4/2-way coolant valve in such a way that the A/C coolant circuit and the coolant circuit can be operated separately or can receive a flow in a serial manner; and
the A/C coolant circuit further comprises at least one A/C coolant radiator for heat transfer to ambient air, a coolant pump and a condenser, by which the A/C coolant circuit is thermally connected to the refrigerant circuit; and
the coolant circuit further comprises at least one battery cooler, a first coolant pump, a drivetrain coolant radiator for heat transfer to the ambient air and a chiller, by which the coolant circuit is thermally connected to the refrigerant circuit; and
the refrigerant circuit further comprises at least one compressor, the condenser, an ambient heat exchanger for heat transfer to the ambient air or for heat uptake from the ambient air, a first expansion element and the chiller,
wherein the 4/2-way coolant valve connects an outlet of the A/C coolant radiator to an inlet of the drivetrain coolant radiator and a first 3/2-way valve is situated at an outlet of the drivetrain coolant radiator with a connection to the A/C coolant circuit.

2. The air conditioning and the battery cooling assembly according to claim 1, wherein the refrigerant circuit further comprises a refrigerant heating heat exchanger as an internal condenser for heating a passenger compartment, which is situated in the refrigerant circuit and can be switched to operate in parallel to the condenser or operate instead of the condenser.

3. The air conditioning and the battery cooling assembly according to claim 2, wherein a second coolant pump or an inverter or an E-engine heat exchanger are formed in the coolant circuit and can receive a flow in parallel with the battery cooler.

4. The air conditioning and the battery cooling assembly according to claim 3, wherein a front evaporator with a corresponding first upstream expansion element or a rear evaporator with a corresponding second upstream expansion element are arranged in the refrigerant circuit, switched in parallel, or a low pressure collector is situated in the refrigerant circuit before the compressor.

5. The air conditioning and the battery cooling assembly according to claim 4, wherein an auxiliary heating device is situated at the rear evaporator or at the refrigerant heating heat exchanger.

6. The air conditioning and the battery cooling assembly according to claim 1, wherein the coolant circuit further comprises a heating device, which is connected in series in front of the battery cooler and in that, furthermore, a bypass to the battery cooler or a bypass to the heating device is formed.

7. The air conditioning and the battery cooling assembly according to claim 1, wherein a second expansion element is situated in the refrigerant circuit downstream of the condenser and upstream of the ambient heat exchanger.

8. The air conditioning and the battery cooling assembly according to claim 1, wherein two parallel channels are formed in the coolant circuit for cooling of a front drive and a rear drive.

9. A method for operating an air conditioning and a battery cooling assembly according to claim 4, wherein, when a refrigerating power is required for battery quick charging, the chiller is operated in the refrigerant circuit and a heat of condensation from the refrigerant circuit is transferred partly across the condenser to an AC coolant circuit and partly across the ambient heat exchanger to the ambient air, wherein the coolant circuit is formed from a series connection of the A/C coolant radiator, the 4/2-way coolant valve and the drivetrain coolant radiator and from the first 3/2-way valve as well as the condenser and heat of condensation is given off to the ambient air, wherein the A/C coolant radiator and the drivetrain coolant radiator are connected in series across the 4/2-way coolant valve and the battery cooler forms a separate coolant circuit with the chiller of the refrigerant circuit and the coolant circuit is connected across a bypass in the circuit with the heat exchangers.

10. The method for operating the air conditioning and the battery cooling assembly according to claim 9, wherein the front evaporator or the rear evaporator are operated in addition in the refrigerant circuit, besides the chiller, in order to generate cold for air conditioning of the passenger compartment.

11. The method for operating the air conditioning and the battery cooling assembly according to claim 9, wherein, when the refrigerating power is required for air conditioning of the passenger compartment and cooling of the battery, the chiller and the front evaporator or the rear evaporator are operated in the refrigerant circuit and the heat of condensation from the refrigerant circuit is transferred across the ambient heat exchanger to the ambient air and across the condenser to the A/C coolant circuit and across the A/C coolant radiator to the ambient air, wherein the drivetrain coolant radiator surrenders waste heat from the coolant circuit to the ambient air, and wherein the battery cooler forms a separate coolant circuit with the chiller of the refrigerant circuit.

12. The method for operating the air conditioning and the battery cooling assembly according to claim 9, wherein, when the refrigerating power is required for air conditioning of the passenger compartment, passive electronic drivetrain cooling, and passive battery cooling, the front evaporator or the rear evaporator are operated in the refrigerant circuit and the heat of condensation from the refrigerant circuit is transferred across the ambient heat exchanger to the ambient air, wherein waste heat from the coolant circuit and from the battery cooler switched in parallel with the drivetrain is given off across the series-connected AC coolant radiator and the drivetrain coolant radiator to the ambient air, wherein the coolant circuit is taken from a second 3/2-way valve across the 4/2-way valve, the condenser and the AC coolant radiator to a third 3/2-way valve as a branching point for a drive cooling channel and a battery cooling channel.

13. The method for operating the air conditioning and the battery cooling assembly according to claim 9, wherein, during passenger compartment heating and battery heating and when the refrigerating power is required for the active electronic drivetrain cooling, the chiller is operated in the refrigerant circuit and the heat of condensation from the refrigerant circuit is given off to the refrigerant heating heat exchanger to the passenger compartment and across the ambient heat exchanger to the ambient air, wherein the battery cooler is connected with a heating device in a separate circuit to the battery heating.

14. The method for operating the air conditioning and the battery cooling assembly according to claim 9, wherein, during passenger compartment heating, passive electronic drivetrain heating, and active battery cooling, waste heat from the refrigerant circuit is given off to the refrigerant heating heat exchanger, wherein the battery coolant circuit is connected with the battery cooler and the chiller and the coolant circuit is connected in the circuit with passive self-heating across a bypass.

15. The method for operating the air conditioning and the battery cooling assembly according to claim 9, wherein, during passenger compartment heating and passive E-drivetrain heating, waste heat from the refrigerant circuit is given off to the refrigerant heating heat exchanger, wherein the battery coolant circuit is connected to the chiller and a heating device and is heated, wherein the battery cooler receives no flow after a second 3/2-way valve and the coolant circuit is connected in the circuit with passive self-heating across a bypass.

* * * * *